(12) United States Patent
Uenosono et al.

(10) Patent No.: US 7,995,306 B2
(45) Date of Patent: Aug. 9, 2011

(54) SHAFT, HYDRODYNAMIC BEARING DEVICE, SPINDLE MOTOR, AND RECORDING AND REPRODUCING APPARATUS

(75) Inventors: Kaoru Uenosono, Ehime (JP); Akira Ninomiya, Ehime (JP); Takahiro Kishi, Ehime (JP)

(73) Assignee: Panasonic Corporation, Osaka (JP)

( * ) Notice: Subject to any disclaimer, the term of this patent is extended or adjusted under 35 U.S.C. 154(b) by 744 days.

(21) Appl. No.: 12/108,004

(22) Filed: Apr. 23, 2008

(65) Prior Publication Data

US 2009/0022043 A1    Jan. 22, 2009

(30) Foreign Application Priority Data

Jul. 18, 2007  (JP) .................. 2007-186812

(51) Int. Cl.
*G11B 17/02* (2006.01)
(52) U.S. Cl. ..................................... 360/99.08
(58) Field of Classification Search .......................... None
See application file for complete search history.

(56) References Cited

U.S. PATENT DOCUMENTS

2009/0016655 A1 *   1/2009   Nakajima et al. ............. 384/100

FOREIGN PATENT DOCUMENTS

JP           2006-136180         5/2006

* cited by examiner

*Primary Examiner* — David D Davis
(74) *Attorney, Agent, or Firm* — Wenderoth, Lind & Ponack, L.L.P.

(57) ABSTRACT

According to the present invention, when processing shafts in a centerless grinding machine, engagement between the shafts is prevented without rearranging the shafts, and thus outer circumferential faces of the shafts can be precisely processed. A shaft 12 is used in a hydrodynamic bearing device, and includes a cylindrical column formed with an outer circumferential face 12a forms a hydrodynamic radial bearing portion, a tapped hole 12j that is formed at a first end of the cylindrical column, and a first projecting portion 12b formed at a second end of the cylindrical column. When the first end and the second end of the shafts 12 are arranged side by side in an axis direction, the first projecting portion 12b of the shaft 12 can not interfere with the tapped hole 12j of the other shaft 12.

13 Claims, 8 Drawing Sheets

SHAFT, HYDRODYNAMIC BEARING DEVICE, SPINDLE MOTOR, AND RECORDING AND REPRODUCING APPARATUS

FIELD OF THE INVENTION

The present invention relates to a shaft, a hydrodynamic bearing device having the same, a spindle motor, and a recording and reproducing apparatus, and in particular relates to a shaft formed with an outer circumferential face to form a part of a hydrodynamic radial bearing portion, a hydrodynamic bearing device having the same, a spindle motor, and a recording and reproducing apparatus.

BACKGROUND OF THE INVENTION

Recently, a hydrodynamic bearing device is used in a motor for rotationally driving a storage medium such as a hard disk drive for performance purposes such as quietness and impact resistance. Known examples of the basic configuration of this hydrodynamic bearing device include the bearing configuration of a motor described in JP 2006-136180A (laid-open on May 25, 2006).

More specifically, as shown in FIG. 1 of JP 2006-136180A, the hydrodynamic bearing device is mainly constituted by a sleeve serving as a fixed member and a shaft serving as a rotating member that is supported so as to be rotatable inside the sleeve, where a clearance between the members is filled with lubricating oil, thereby forming a radial bearing portion and a thrust bearing portion. More specifically, the radial bearing portion is formed between the outer circumferential face of the shaft and the inner circumferential face of the sleeve, and the thrust bearing portion is formed between one face in the axis direction of a thrust flange that is fixed to one end of the shaft and a sleeve end face, and between the other face in the axial direction of the thrust flange and a thrust plate face that are opposed thereto.

Furthermore, a spindle motor is implemented by fixing a disk mounting hub to the hydrodynamic bearing device, and forming an electromagnetic driving portion constituted by a magnet fixed to the hub and a stator fixed on the sleeve side. Herein, in particular, in a spindle motor for a 2.5 inch or smaller hard disk drive, the shaft is joined to the hub by press-fitting or bonding, and a magnetic disk is mounted on the hub. In order to fix the magnetic disk to the hub, a clamper is attached to the shaft and the hub with a bolt, and the magnetic disk is pressed against a disk mounting face. The bolt is threaded into a tapped hole formed at the other end of the shaft. In such a structure, necessary runout precision (perpendicularity) has to be secured between the hub and the shaft, and the hub and the shaft has to be managed such that they are lower than the clamper and that their runout precision (perpendicularity) is relative to the clamper is good. Thus, as shown in the drawing, the shaft is stepped, and the hub is joined such that the hub is seated on the stepped portion of the shaft.

A first small-diameter projecting portion for fixing the thrust flange is formed on one end side of the shaft. The diameter and the projection amount of the first projecting portion relate to the joint strength between the shaft and the thrust flange, and runout precision between the shaft and the thrust flange. Thus, these items are set so as to obtain satisfactory joint strength and runout precision. Moreover, an end face around the first projecting portion serves as a thrust flange attachment face on which the thrust flange is seated, and thus the perpendicularity of the end face with respect to the main body outer circumferential face is required to be highly precise.

In order to secure the joint strength between the shaft and the thrust flange, it is conceivable, for example, to increase the amount of projection of the first projecting portion in the axis direction. However, since room has to be kept also for the space constituting the radial bearing portion, the amount of projection of the first projecting portion in the axis direction cannot be extremely large. Thus, in order to secure the joint strength between the shaft and the thrust flange, generally, the outer diameter of the first projecting portion is increased to the greatest extent possible.

The outer circumferential face of the shaft defines a part of the radial bearing portion of the hydrodynamic bearing device, and thus it is necessary to precisely process the outer circumferential face of the shaft. Thus, a centerless grinding machine is generally used to grind the outer circumferential face of the shaft in the final finish. A centerless grinding machine has, for example, a blade that extends in one direction, and a grinding roller (rotating at high speed) and a feeding roller (rotating at low speed) that extends in the same direction parallel to each other. The grinding roller and the feeding roller are arranged with a predetermined space interposed therebetween in the path above the blade, and rotate in mutually opposite directions. A plurality of shafts are fed to a position between the rollers on the blade. At that time, the shafts are braked by the feeding roller and the blade, and outer circumferential faces of the shafts are ground by the grinding roller. The shafts are transported in the longitudinal direction because the central axis of the feeding roller is inclined as appropriate. With the above-described operation, the plurality of shafts are transported in one direction while end portions in the axis direction of the shafts abutting against each other.

On the other hand, as described above, the first projecting portion to which the thrust plate is to be attached is formed at one end of the shaft for the hydrodynamic bearing device, and the tapped hole is formed at the other end. Thus, in the centerless grinding machine, the following three cases are conceivable as to how the shafts abut against each other.

(First case) The end portions on the side of the first projecting portions of the shafts abut against each other.

(Second case) The end portions on the side of the tapped holes of the shafts abut against each other.

(Third case) The end portion on the side of the first projecting portion abuts against the end portion on the side of the tapped hole of the shafts.

In the first and the second cases, there is no particular problem, because the end faces abut against each other. However, in the third case, due to the relationship between their sizes, the first projecting portion may interfere with the tapped hole, and thus the shafts may become engaged (that is, caught), so that the centers of their axes may be inclined to each other. In this case, the centerless grinding machine cannot precisely process the outer circumferential faces of the shafts. More specifically, the cylindrically and the roundness on the outer circumferential faces of the shafts are deteriorated. As a result, the perpendicularity of the thrust flange attachment face on the side of the first projecting portion decreases with respect to the outer circumferential face of the shaft, and thus the performance of the hydrodynamic bearing device is deteriorated.

It should be noted that even when the surface roughness of portions that interfere with each other is reduced, if the coaxiality of the tapped hole or the first projecting portion with respect to the outer circumferential face of the shaft is not sufficiently high, then the shafts cannot be prevented from tilting at the time of grinding.

Herein, when feeding the shafts to the centerless grinding machine, it takes effort and increases production cost to feed the shafts with an arrangement such that the above-described third case does not occur. Moreover, even when the shafts are rearranged, loading errors cannot be completely prevented.

SUMMARY OF THE INVENTION

It is an object of the present invention, when processing shafts in a centerless grinding machine, to prevent engagement between the shafts without rearranging the shafts, to precisely process outer circumferential faces of the shafts, and thus to prevent the perpendicularity of a thrust flange attachment face and a hub attachment face from being poor.

A shaft according to a first aspect is used in a hydrodynamic bearing device. The shaft comprises: a cylindrical column formed with an outer circumferential face to form a hydrodynamic radial bearing portion; a recess portion that is formed at a first end of the cylindrical column; and a first projecting portion that is formed at a second end of the cylindrical column. When a plurality of shafts are arranged such that the first end and the second end of the shafts are arranged side by side in a shaft axis direction, the first projecting portion of one shaft can not interfere with the recess portion of the other shaft.

Thus, when a plurality of shafts are ground in a centerless grinding machine, the shafts do not become engaged with each other, so that outer circumferential faces of the shafts can be precisely ground, while the perpendicularity of end faces on both sides before grinding is maintained.

It is preferable that an outer diameter of the first projecting portion is smaller than the minimum inner diameter of the recess portion.

In this case, the first projecting portion of a shaft does not interfere with the recess portion of another shaft. As a result, when a plurality of shafts are ground in a centerless grinding machine, the shafts do not become engaged with each other, so that outer circumferential faces of the shafts can be precisely ground, while the perpendicularity of end faces on both sides before grinding is maintained.

Furthermore, it is also preferable that the first end or the second end of the cylindrical column further comprises a second projecting portion. In this case, it is preferable that when the first end and the second end of main bodies of the shafts are arranged side by side in a shaft axis direction, the second projecting portion prevents the first projecting portion from interfering with the recess portion by abutting against an end face on the side of the second end or the first end of another shaft.

In this case, the first projecting portion of a shaft does not interfere with the recess portion of another shaft. As a result, when a plurality of shafts are ground in a centerless grinding machine, the shafts do not become engaged with each other, so that outer circumferential faces of the shafts can be precisely ground, while the perpendicularity of end faces on both sides before grinding is maintained.

Furthermore, it is preferable that the second projecting portion is formed at the first end of the cylindrical column, and a tip end of the second projecting portion can abut against a portion around the first projecting portion at the second end of another shaft.

In this case, the second projecting portion of a shaft abuts against a portion around the first projecting portion of another shaft, and thus the first projecting portion does not move any more toward the recess portion. As a result, when a plurality of shafts are ground in a centerless grinding machine, the shafts do not become engaged with each other, so that outer circumferential faces of the shafts can be precisely ground, while the perpendicularity of end faces on both sides before grinding is maintained.

Furthermore, it is preferable that the second projecting portion is in the shape of a cylinder, and has an inner diameter that is larger than an outer diameter of the first projecting portion.

In this case, it is less likely that the second projecting portion of a shaft will interfere with the first projecting portion of another shaft. As a result, when a plurality of shafts are ground in a centerless grinding machine, the shafts do not become engaged with each other, so that outer circumferential faces of the shafts can be precisely ground, while the perpendicularity of end faces on both sides before grinding is maintained.

Furthermore, it is also preferable that the minimum outer diameter of the first projecting portion is larger than the maximum inner diameter of an opening portion of the recess portion.

Herein, the maximum inner diameter of the opening portion includes a chamfer that is provided at an end portion of the recess portion. In this case, the first projecting portion of a shaft does not enter the recess portion of another shaft. As a result, when a plurality of shafts are ground in a centerless grinding machine, the shafts do not become engaged with each other, so that outer circumferential faces of the shafts can be precisely ground, while the perpendicularity of end faces on both sides before grinding is maintained.

Herein, it is preferable that a thrust flange is to be attached to the first projecting portion.

In this case, when the outer circumferential face of the shaft is precisely ground, the runout precision (perpendicularity) of an end face with respect to the outer circumferential face of the shaft is improved, and the bearing performance of the radial bearing portion and the thrust bearing portion of the hydrodynamic bearing device is improved.

Furthermore, it is preferable that a tapped hole is formed in the recess portion.

Moreover, it is preferable that the tapped hole is a hole into which a screw for fixing a clamper is to be threaded.

It should be noted that it is allowed not to form the tapped hole in the recess portion.

A hydrodynamic bearing device according to another aspect comprises: the shaft according to the first aspect; and a sleeve formed with a hole for accommodating the shaft.

In this apparatus, the precision of the shaft has been improved, and thus the performance of each hydrodynamic bearing portion is high.

A spindle motor according to another aspect comprises: the hydrodynamic bearing according to the above-described other aspect; a rotating member configured to rotate together with one of the shaft and the sleeve of the hydrodynamic bearing device; and an electromagnetic driving portion for rotationally driving the rotating member.

In this spindle motor, important performance such as the rotational precision of the hydrodynamic bearing device is high, so that vibrations and the like are reduced, bearing life becomes longer, and highly quiet operations are obtained.

A recording and reproducing apparatus according to another aspect comprises: the spindle motor according to the above-described other aspect; and storage medium that can be mounted on the rotating member.

In this apparatus, the performance of the hydrodynamic bearing device is high, so that vibrations of the storage medium are reduced, and recording and reproduction at high density becomes possible. Moreover, bearing life is long, and thus the reliability as a recording and reproducing apparatus is high. Furthermore, higher quietness is obtained.

With the shaft according to the present invention, when processing the shafts in a centerless grinding machine, engagement between the shafts is prevented without rearranging the shafts, and thus outer circumferential faces of the shafts can be precisely processed.

With the hydrodynamic bearing device according to the present invention, the runout precision (perpendicularity) of an end face with respect to the outer circumferential face of the shaft is improved, and the bearing performance of the radial bearing portion and the thrust bearing portion of the hydrodynamic bearing device is improved. Accordingly, abrasion at the time of start or stopping is reduced, and bearing life and reliability can be improved.

Furthermore, with the recording and reproducing apparatus incorporating the spindle motor according to the present invention, vibrations of the storage medium are reduced, and thus recording and reproduction at higher density becomes possible.

Also, vibrations in the apparatus are also reduced, and thus higher quietness can be obtained.

DETAILED DESCRIPTION OF THE INVENTION

Hereinafter, a spindle motor incorporating a hydrodynamic bearing device according to an embodiment of the present invention shall be described with reference to FIG. 1.

First Embodiment

Figure 1:
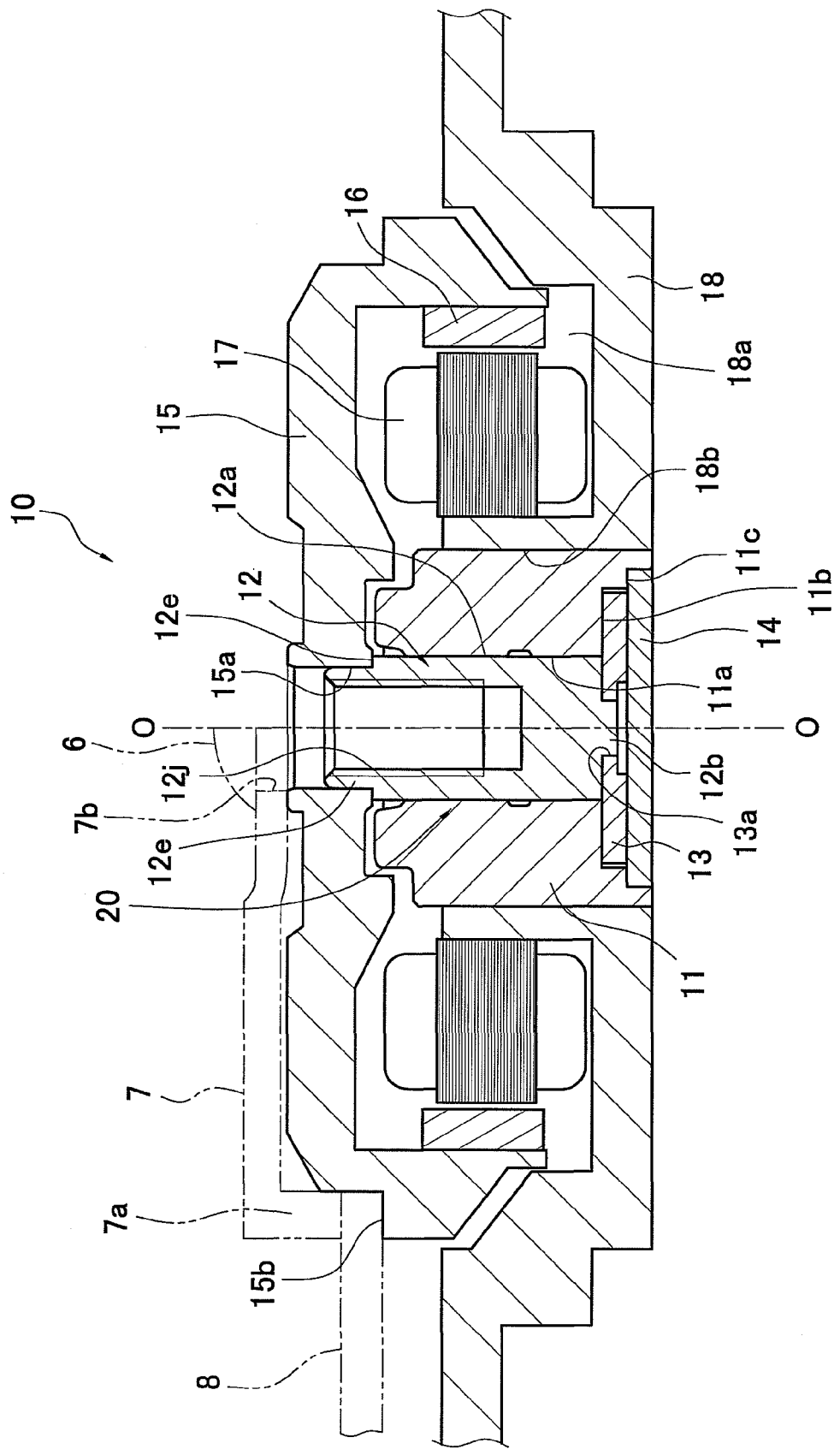
FIG. 1 is a cross-sectional view showing the configuration of a spindle motor incorporating a hydrodynamic bearing device according to an embodiment of the present invention is mounted.

As shown in FIG. 1, a spindle motor 10 according to this embodiment is provided with a rotor hub (rotating side) 15, a rotor magnet 16, a stator 17, a base 18, a hydrodynamic bearing device 20, and the like.

The hydrodynamic bearing device 20 has a sleeve 11, a shaft 12, a thrust flange 13, and a thrust plate 14.

The sleeve 11 has a bearing hole 11a and is fixed to the base 18. The sleeve 11 is made of a metal material such as iron, an iron alloy, copper, or a copper alloy. Moreover, the sleeve 11 is provided with a first step portion 11b that is opposed to a radially outer portion of the thrust flange 13, and the radially outer portion of the thrust flange 13 is positioned with a clearance interposed between the radially outer portion and the first step portion 11b. Furthermore, the sleeve 11 is provided with a second step portion 11c whose diameter is larger than that of the first step portion 11b, and the disk-shaped thrust plate 14 is fixed to the second step portion 11c by bonding, caulking, press-fitting, welding, or the like.

Furthermore, on the inner circumferential side face of the bearing hole 11a of the sleeve 11, herringbone-shaped radial hydrodynamic grooves (not shown) are formed side by side in the axis direction. It should be noted that the radial hydrodynamic grooves may be spiral-shaped. Moreover, a surface of the sleeve 11 may be nickel plated, for example.

The shaft 12 is a columnar member made of a metal material (such as SUS420) that is not a sintered compact, and is inserted into the bearing hole 11a so as to be in a rotatable state.

The shaft 12 is mainly constituted by a columnar main body, and an outer circumferential face 12a of the main body defines a part of the radial bearing portion. A tapped hole 12j is open at an upper end portion (first end) of the main body, and a first projecting portion 12b is formed at a lower end portion (second end) of the main body. The disk-shaped thrust flange 13, having a central portion formed with a circular central hole 13a, is fitted and welded to the first projecting portion 12b.

The thrust flange 13 is accommodated in a space that is enclosed by the step portion 11b of the sleeve 11 and the thrust plate 14 serving as a thrust bearing member. The lower face of the thrust flange 13 is opposed to the thrust plate 14, and the radially outer portion of the upper face is opposed to the step portion 11b of the sleeve 11. Moreover, thrust hydrodynamic grooves (not shown) are formed on a face of the step portion 11b of the sleeve 11 opposed to the upper face of the thrust flange 13.

The thrust plate 14 is a substantially disk-shaped member that is attached so as to cover a lower portion of the hydrodynamic bearing device 20. Thrust hydrodynamic grooves (not shown) are formed on a surface of the upper portion of the thrust plate 14. It should be noted that the faces in which the thrust hydrodynamic grooves are formed are not limited to the configuration of this embodiment, as long as the thrust hydrodynamic grooves are formed on one of mutually opposed members defining an axial clearance. That is to say, the thrust hydrodynamic grooves may be formed on the lower face of the thrust flange 13, the upper face of the thrust flange 13, or both faces thereof.

The rotor hub 15 is substantially in the shape of a bowl. A through-hole 15a is formed at a substantially central portion of the rotor hub 15. The upper end portion of the shaft 12 is firmly attached to the through-hole 15a by press-fit bonding or the like. The rotor magnet 16 of the spindle motor is attached to the rotor hub 15, and is opposed in the radial direction to the stator 17. A magnetic recording disk 8 is fixed to the rotor hub 15. As a whole, these components together with other configurations constitute a hard disk drive. More specifically, the magnetic recording disk 8 is mounted on a mounting face 15b of the hub 15, and is fixed to the hub 15, while the magnetic recording disk 8 being pressed by a clamper 7 against the mounting face 15b. The clamper 7 is a substantially disk-shaped member, and has an annular radially abutting portion 7a that abuts against the magnetic recording disk 8, and a central hole 7b. The clamper 7 is fixed by a bolt 6 to the shaft 12 and the hub 15. More specifically, the bolt 6 passes through the central hole 7b of the clamper 7, and is threaded into the tapped hole 12j of the shaft 12.

The clearance between the outer circumferential face 12a of the shaft 12 and the bearing hole 11a of the sleeve 11, the clearance between the thrust flange 13 and the sleeve 11, and the clearance between the thrust flange 13 and the thrust plate 14 are filled with lubricating fluid such as oil, air, grease and so on.

The rotor magnet 16 is attached on the side of an inner circumferential face of the rotor hub 15, and rotates the rotor hub 15 by repeatedly attracting and repelling the stator 17, which is opposed to the rotor magnet 16.

A recess portion 18a for accommodating an electromagnetic driving portion including the stator 17 and the rotor magnet 16 is formed in the base 18. A substantially central portion of the recess portion 18a is provided with a hole 18b to which the sleeve 11 is firmly attached. The stator 17, made of cores around which coils are wound, is fixed by bonding or the like to the portion defining the hole 18b of the base 18.

Figure 3:
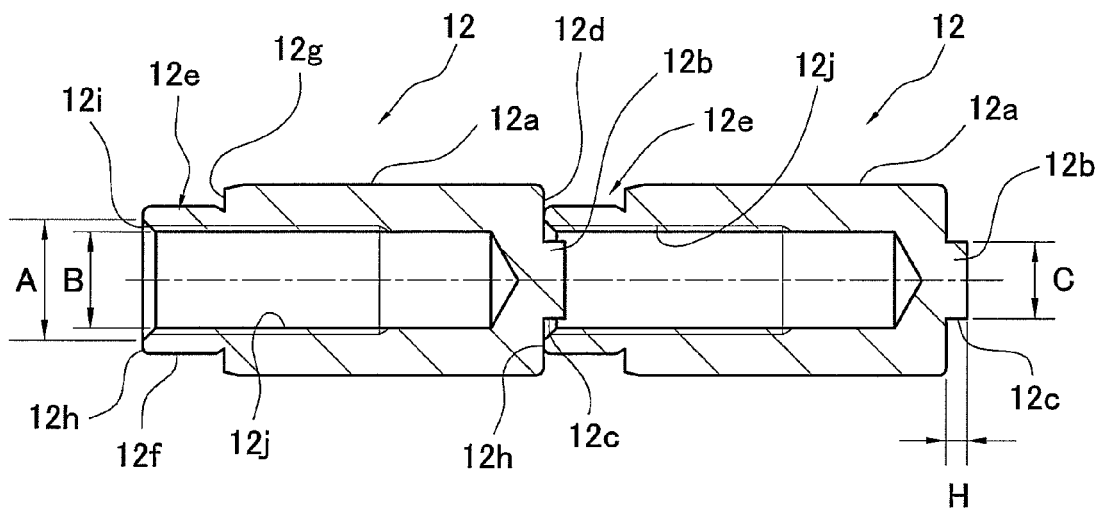
FIG. 3 is a cross-sectional view of shafts according to an embodiment of the present invention.

Next, the structure of the shaft 12 shall be described in detail with reference to FIG. 3. As described above, the first projecting portion 12b is formed at one end of the shaft 12. The first projecting portion 12b is a portion projecting in the axis direction from the end face at one end of the shaft 12, and is more specifically a first projecting portion that is circular and formed in the vicinity of the center of the end face. The first projecting portion 12b has an outer circumferential face 12c, and an end face 12d is formed around the first projecting portion 12b. The end face 12d is a flat face facing in the axis direction, and is formed perpendicular to the outer circumferential face 12a of the shaft 12. An inner circumferential face of the central hole 13a of the thrust flange 13 is fitted around the outer circumferential face 12c of the first projecting portion 12b, and an end face on the inner circumferential side of the thrust flange 13 is seated on the end face 12d. Accordingly, the coaxiality of the outer circumferential face 12c with respect to the main body outer circumferential face 12a, and the perpendicularity of the end face 12d with respect to the main body outer circumferential face 12a, are required to be highly precise.

A second projecting portion 12e is formed at the other end of the shaft 12. The second projecting portion 12e is a portion projecting in the axis direction from an end face at the other end of the shaft 12, and is more specifically a second projecting portion that is circular and formed in the vicinity of the center of the end face. The second projecting portion 12e has an outer circumferential face 12f, and an end face 12g is formed around the second projecting portion 12e. The end face 12g is a flat face in the axis direction, and is formed perpendicular to the outer circumferential face 12a of the shaft 12. An inner circumferential face of the through-hole 15a of the rotor hub 15 is fitted to the outer circumferential face 12f of the second projecting portion 12e, and an end face on the inner circumferential side of the rotor hub 15 is seated on the end face 12g. Accordingly, the coaxiality of the outer circumferential face 12f with respect to the main body outer circumferential face 12a, and the perpendicularity of the end face 12g with respect to the main body outer circumferential face 12a, are required to be highly precise.

The tapped hole 12j is formed at one end of the shaft 12. The tapped hole 12j is not a through-hole, but is formed comparatively deep to extend in the vicinity of the end portion on the side of the first projecting portion 12b. The screw portion of the tapped hole 12j is formed from a middle portion of the main body to a tip end of the second projecting portion 12e. A chamfer 12i is formed in the vicinity of the end face of the tapped hole 12j. The opening angle of the chamfer 12i is approximately 90 degrees, and thus the insertability of a screw is improved. It should be noted that the surface roughness of the chamfer 12i is based on the criterion that there is no burr.

The outer diameter of the chamfer 12i of the second projecting portion 12e is the maximum outer diameter of a recess portion constituted by the tapped hole 12j and the like, and is given as A in the following description. Also, the inner diameter of the tapped hole 12j (which is the inner diameter of the female screw, and is the minimum inner diameter of the recess portion constituted by the tapped hole 12j and the like) is given as B in the following description. Furthermore, when the diameter of the first projecting portion 12b is given as C, and length (height) in the axis direction of the first projecting portion 12b is given as H, B>C in FIG. 3.

More specifically, for example, when the outer diameter of the main body of the shaft 12 is 3.0 mm, then M2 is used as a size of the tapped hole 12j; C is set to 1.2 to 1.5 mm, and the outer diameter of 12e is set to 2.5 mm, such that B>C. When the outer diameter of the main body of the shaft 12 is smaller than 3.0 mm, then a M1.6 or M1.4 fine screw is used; C is set to 1.0 mm, and the outer diameter of the second projecting portion 12e is set to 2.0 mm, such that B>C.

Next, a method for producing the shaft 12 shall be described.

First, the tapped hole 12j is formed on the main body of the shaft 12, and the first projecting portion 12b and the second projecting portion 12e is formed. At that time, the processing for forming the end faces 12d and 12g of the shaft 12 is performed in a precise manner. Moreover, if necessary, hardening treatment such as quenching or nitriding treatment is performed.

Figure 2:
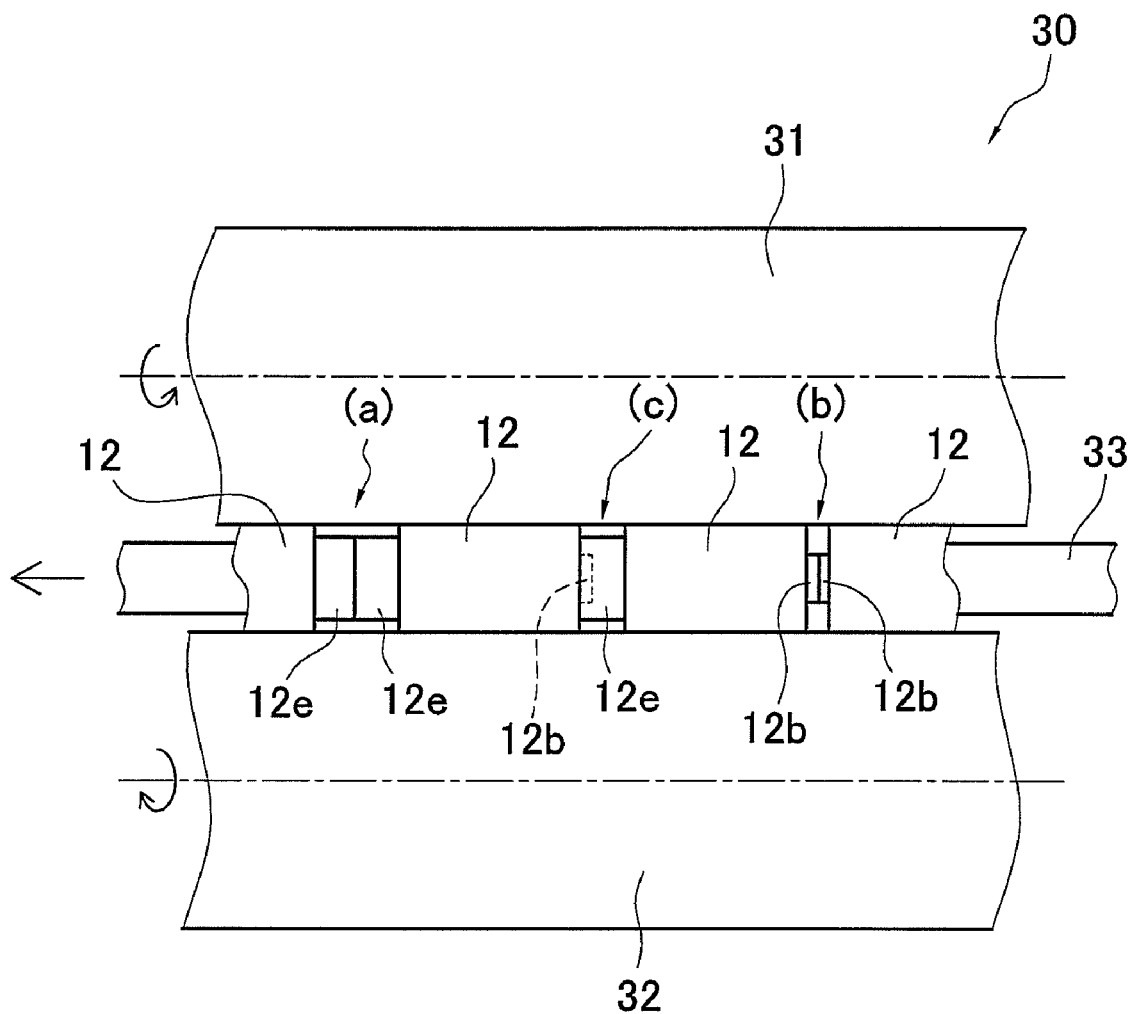
FIG. 2 is a schematic view showing a state in which shafts are processed in a centerless grinding machine.

Next, the shafts 12 are fed to a centerless grinding machine, and the outer circumferential faces 12a of the shafts 12 are ground. As shown in FIG. 2, a centerless grinding machine 30 has a blade 33 that extends in one direction, and a grinding roller 31 (rotating at high speed) and a feeding roller 32 (rotating at low speed) that extend in one direction parallel to each other. The grinding roller 31 and the feeding roller 32 are arranged with a predetermined space interposed therebetween in the path above the blade 33, and rotate in mutually opposite directions. The plurality of shafts 12 are fed to a position between the rollers 31 and 32 while their orientation being not particularly arranged (at random). At that time, the shafts 12 are braked by the feeding roller 32 and the blade 33, and the outer circumferential faces 12a are ground by the grinding roller 31. The shafts 12 can be transported in the longitudinal direction because the central axis of the feeding roller 32 is inclined as appropriate. With the above-described structure, while the plurality of shafts 12 are successively transported on the blade 33, the outer circumferential faces 12a of the shafts 12 are ground by the grinding roller 31.

In this case, the orientations of the shafts 12 are not particularly arranged, and thus the end portions of the adjacent shafts 12 may abut against each other in the following patterns.

Relationship (a) in FIG. 2: the end portions (the second projecting portions 12e) on the side of the tapped holes 12j of the shafts 12 abut against each other.

Relationship (b) in FIG. 2: the end portions on the side of the first projecting portions 12b of the shafts 12 abut against each other.

Relationship (c) in FIG. 2: the end portion on the side of the first projecting portion 12b abuts against the end portion (the second projecting portion 12e) on the side of the tapped hole 12j of the shafts 12.

Herein, the portion (c) in FIG. 2 shall be described with reference to FIG. 3. It should be noted that in the following description, the shaft 12 on the right in FIG. 3 is referred to as a "first shaft 12", and the shaft 12 on the left in FIG. 3 is referred to as a "second shaft 12". An end face 12h of the end portion (the tip end portion of the second projecting portion 12e) on the side of the tapped hole 12j of the first shaft 12 abuts against the end face 12d of the second shaft 12, the first shaft 12 and the second shaft 12 being closest to each other. At that time, the first projecting portion 12b is in the tapped hole 12j, and more specifically, the tip end is positioned at a depth corresponding to the screw groove of the tapped hole 12j. However, as described above, B>C, and thus a radial clearance is given between the outer circumferential face 12c of the first projecting portion 12b and the screw groove. In particular, the relationship between the sizes of B and C is set such that there is no interference therebetween even when eccentricity is caused between the first shaft 12 and the second shaft 12.

As a result, the first projecting portion 12b does not interfere with the tapped hole 12j. Thus, when the plurality of shafts 12 are ground in the centerless grinding machine 30, the shafts 12 do not become engaged with each other, so that the outer circumferential faces 12a of the shafts 12 can be precisely ground (the roundness and the cylindricity on the outer diameter of the shafts 12 are improved).

Accordingly, in the hydrodynamic bearing device 20, the runout precision (perpendicularity) of the end face 12d (the face to which the thrust flange is attached) with respect to the outer circumferential face of the shaft 12 is improved, and the bearing performance of the radial bearing portion and the thrust bearing portion of the hydrodynamic bearing device 20 is improved.

Second Embodiment

Figure 4:
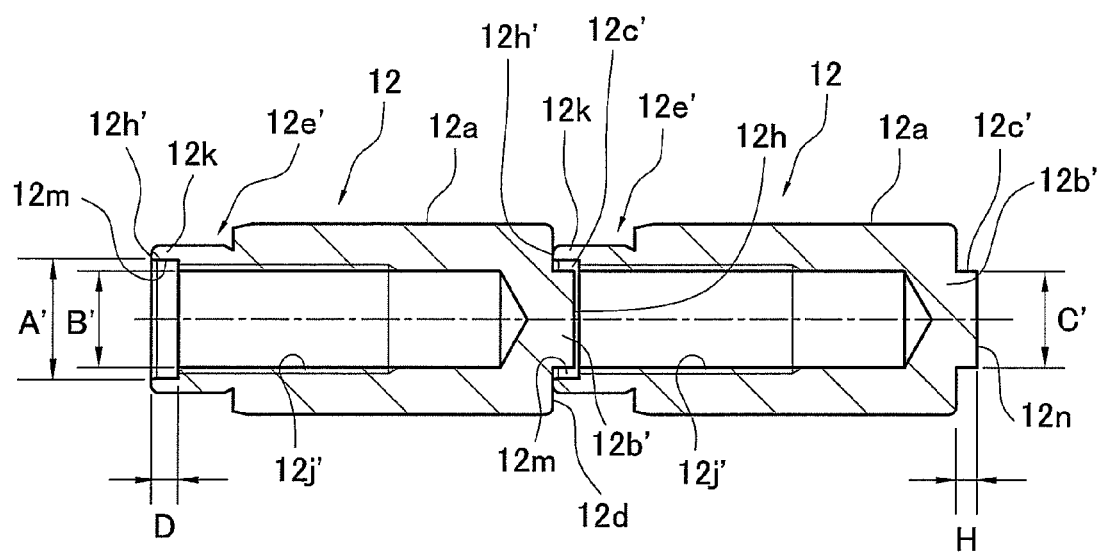
FIG. 4 is a cross-sectional view of shafts according to another embodiment of the present invention.

FIG. 4 shows the structure of the shaft 12 in a second embodiment of the present invention. Unlike the foregoing embodiment, an outer diameter C' of a first projecting portion 12b' of the shaft is close in size to the inner diameter of a tapped hole 12j'.

In a second projecting portion 12e', a cylindrical extending portion 12k is formed that further extends toward the side of the tip end. In other words, the second projecting portion is constituted by a portion having an inner circumferential face with a screw groove, and a portion (12k) that does not have a screw groove and has a larger inner diameter. When the inner diameter of an inner circumferential face 12m of the extending portion 12k is given as A', the inner diameter of the tapped hole 12j' is given as B', and the outer diameter of the first projecting portion 12b' is given as C', then A'>B' and A'>C'. Furthermore, when the length in the axis direction of the extending portion 12k is given as D, and length (height) in the axis direction of the first projecting portion 12b' is given as H, then D>H.

More specifically, for example, C' is 1.5 mm, H is 0.3 mm, D is 0.35 mm, A' is 1.7 mm, and the outer diameter of the second projecting portion 12e' is 2.1 mm.

An end face 12h' of the end portion (the extending portion 12k, which is the tip end portion of the second projecting portion 12e') on the side of the tapped hole 12j of the first shaft 12 abuts against the end face 12d of the second shaft 12, the first shaft 12 and the second shaft 12 being closest to each other. At that time, the first projecting portion 12b' has entered into the inner circumference of the extending portion 12k. However, as described above, D>H, and thus an axial clearance is given between a tip end face 12n of the first projecting portion 12b' and the screw groove. Moreover, A'>C', and thus a radial clearance is given between an outer circumferential face 12c' of the first projecting portion 12b' and the inner circumferential face 12m of the extending portion 12k.

In other words, in the above-described structure, the opening tip end portion of the tapped hole 12j' is formed, not at the tip end of the shaft, but at a position having a depth that prevents interference of the first projecting portion 12b' of another shaft 12. In other words, a counterbore is formed on the side of the tapped opening, and the tapped opening is kept away from the first projecting portion 12b'.

As a result, the first projecting portion 12b' does not interfere with the tapped hole 12j'. Thus, when the plurality of shafts 12 are ground in the centerless grinding machine 30, the shafts 12 do not become engaged with each other, so that the outer circumferential faces 12a of the shafts 12 can be precisely ground.

Accordingly, in the hydrodynamic bearing device 20, the runout precision (perpendicularity) of the end face 12d (the face to which the thrust flange is attached) with respect to the outer circumferential face of the shaft 12 is improved, and the bearing performance of the radial bearing portion and the thrust bearing portion of the hydrodynamic bearing device 20 is improved.

Third Embodiment

Figure 5:
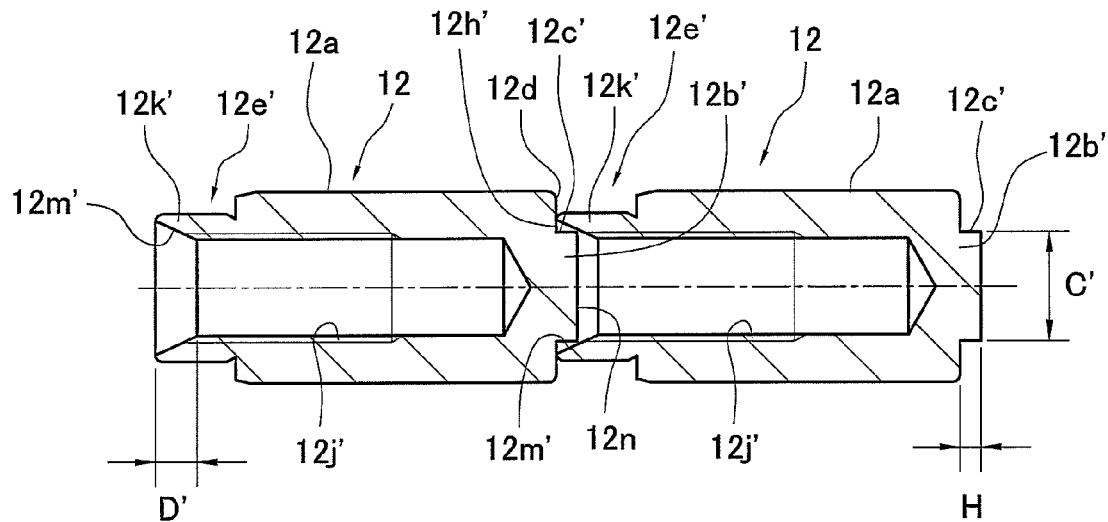
FIG. 5 is a cross-sectional view of shafts according to another embodiment of the present invention.

FIG. 5 shows the structure of the shaft 12 in a third embodiment of the present invention. As in the foregoing embodiment, the outer diameter C' of the first projecting portion 12b' of the shaft is close in size to the inner diameter of the tapped hole 12j'.

A cylindrical extending portion 12k' is formed in the second projecting portion 12e' that further extends to the side of the tip end. An inner circumferential face 12m' of the extending portion 12k' has a chamfer (tapered surface), and has an inner diameter that is larger at any point than that of the tapped hole 12j'. In other words, the second projecting portion is constituted by a portion having an inner circumferential face with a screw groove, and a portion (12k') having an inner circumferential face has a larger inner diameter. It should be noted that the inner diameter at any point of the inner circumferential face 12m' of the extending portion 12k' is larger than the outer diameter C' of the first projecting portion 12b'. When the length in the axis direction of the extending portion 12k' is given as D', and length (height) in the axis direction of the first projecting portion 12b' is given as H, then D'>H.

The end face 12h' of the end portion (the extending portion 12k', which is the tip end portion of the second projecting portion 12e') on the side of the tapped hole 12j' of the first shaft 12 abuts against the end face 12d of the second shaft 12, the first shaft 12 and the second shaft 12 being closest to each other. At that time, the first projecting portion 12b' has entered into the inner circumference of the extending portion 12k'. However, as described above, D'>H, and thus an axial clearance is given between the tip end face 12n of the first projecting portion 12b' and the screw groove. Moreover, a radial clearance is given between the outer circumferential face 12c' of the first projecting portion 12b' and the inner circumferential face 12m' of the extending portion 12k'.

In other words, in the above-described structure, the opening tip end portion of the tapped hole 12j' is formed, not at the tip end of the shaft, but at a position having a depth that prevents interference of the first projecting portion 12b' of another shaft 12. In other words, a counterbore is formed on the side of the tapped opening, and the tapped opening is kept away from the first projecting portion 12b'.

As a result, the first projecting portion 12b' does not interfere with the tapped hole 12j'. Thus, when the plurality of shafts 12 are ground in the centerless grinding machine 30, the shafts 12 do not become engaged with each other, and thus the outer circumferential faces 12a of the shafts 12 can be precisely ground.

Accordingly, in the hydrodynamic bearing device 20, the runout precision (perpendicularity) of the end face 12d (the face to which the thrust flange is attached) with respect to the outer circumferential face of the shaft 12 is improved, and the bearing performance of the radial bearing portion and the thrust bearing portion of the hydrodynamic bearing device 20 is improved.

Fourth Embodiment

Figure 6:
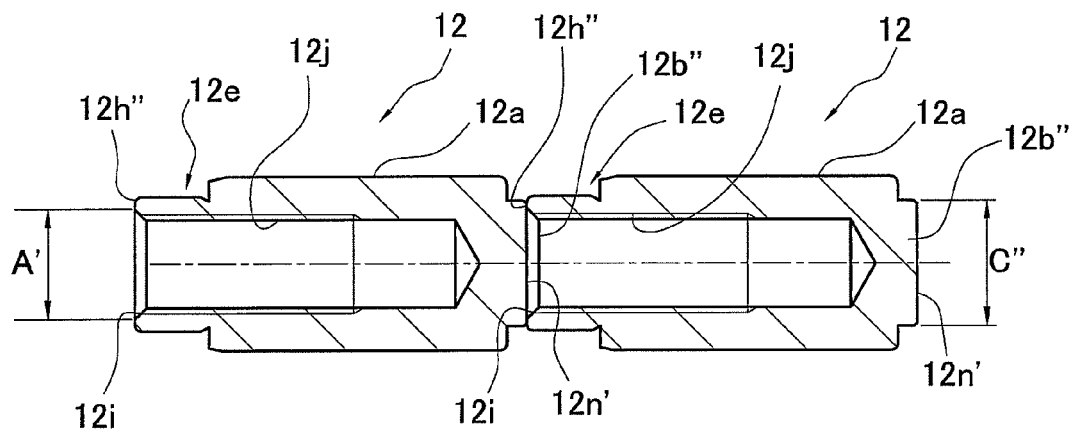
FIG. 6 is a cross-sectional view of shafts according to another embodiment of the present invention.
Figure 7:
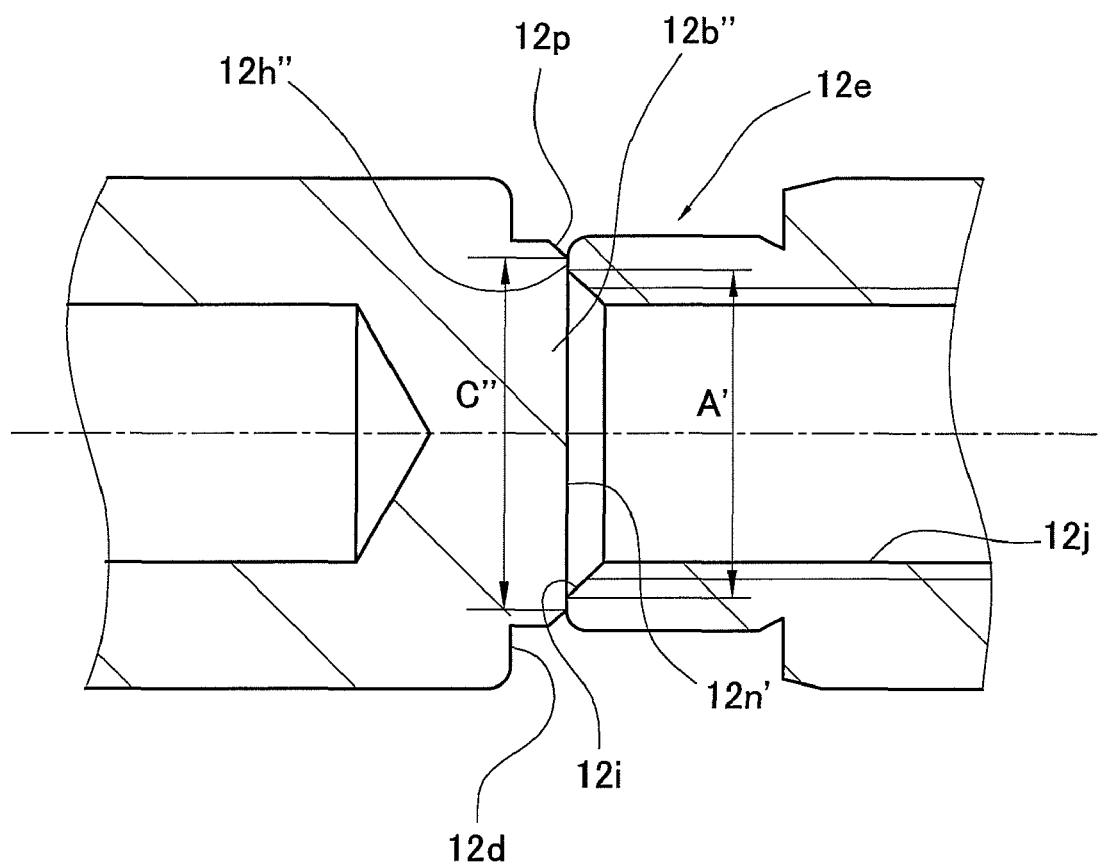
FIG. 7 is a partially enlarged view of FIG. 6, illustrating abutment between shafts.

FIGS. 6 and 7 show the structure of the shaft 12 in a fourth embodiment of the present invention.

A chamfer 12p is formed by C chamfering, R chamfering, or the like on a tip end face of a first projecting portion 12b''. An inner diameter (the minimum outer diameter of the tip end face) C'' of the chamfer 12p is larger, for example, than those in the first to the third embodiments. Thus, as shown in FIGS. 6 and 7, when the outer diameter (the maximum inner diameter of the recess portion or opening portion constituted by the tapped hole 12j and the like) of the chamfer 12i of the second projecting portion 12e is given as A', then C''>A'.

More specifically, for example, C'' is 1.8 mm, and A' 1.7 mm.

A tip end face 12h'' of the end portion (the second projecting portion 12e) on the side of the tapped hole 12j of the first shaft 12 abuts against (the radially outer portion of) an end face 12n' of the first projecting portion 12b'' of the second shaft 12. In particular, the relationship between the sizes of C'' and A' is set such that the first projecting portion 12b'' does not interfere with the tapped hole 12j even when eccentricity is caused between the first shaft 12 and the second shaft 12.

As a result, the first projecting portion 12b'' does not interfere with the tapped hole 12j. Thus, when the plurality of shafts 12 are ground in the centerless grinding machine 30, the shafts 12 do not become engaged with each other, so that the outer circumferential faces 12a of the shafts 12 can be precisely ground.

Accordingly, in the hydrodynamic bearing device 20, the runout precision (perpendicularity) of the end face 12d (the face to which the thrust flange is attached) with respect to the outer circumferential face of the shaft 12 is improved, and the bearing performance of the radial bearing portion and the thrust bearing portion of the hydrodynamic bearing device 20 is improved.

Fifth Embodiment

Figure 8:
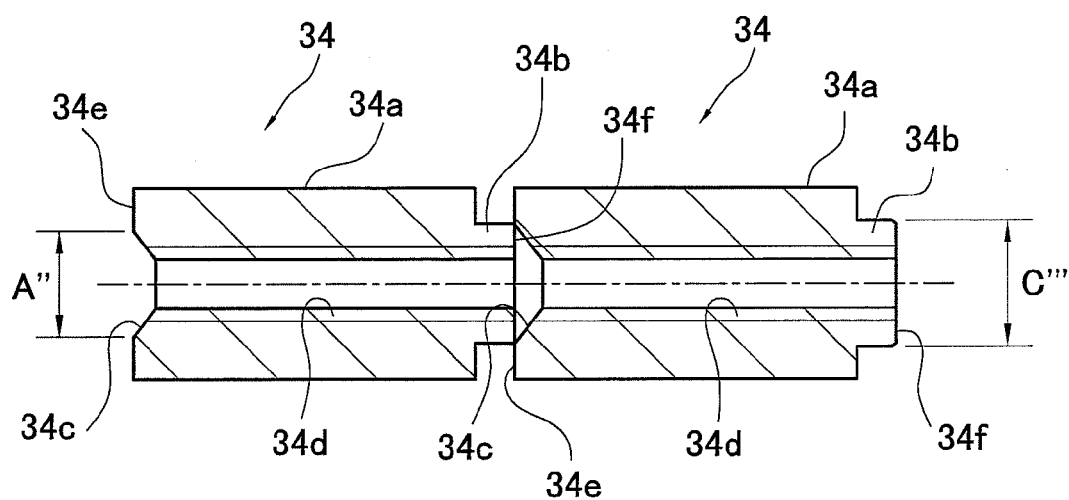
FIG. 8 is a cross-sectional view of shafts according to another embodiment of the present invention.
Figure 9:
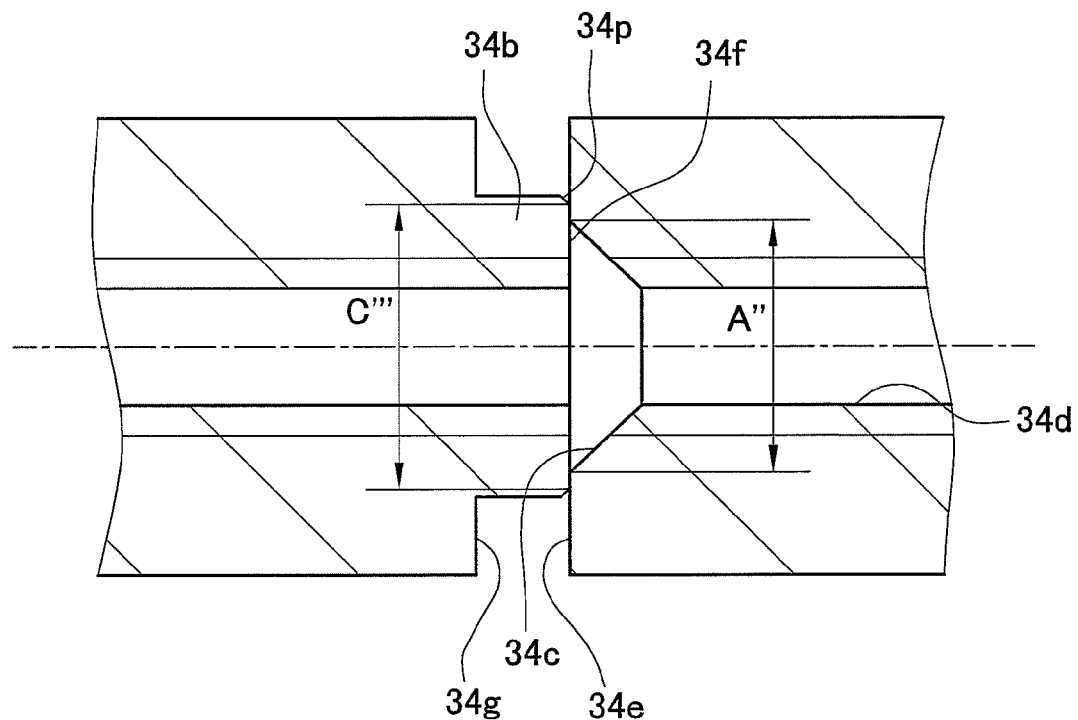
FIG. 9 is a partially enlarged view of FIG. 8, illustrating abutment between shafts.

FIGS. 8 and 9 show the structure of a shaft 34 in a fifth embodiment of the present invention. In this embodiment, the shaft 34 has a tapped hole 34d that passes through in the axis direction. The shaft 34 has a first projecting portion 34b at one end, and a recess portion 34c at the other end. The recess portion 34c has a tapered surface whose diameter becomes smaller as the recess portion becomes deeper, and is continuous with the tapped hole 34d. The recess portion 34c is formed at the central portion on the end face, and an end face 34e is formed around the recess portion 34c.

In a hydrodynamic bearing using the shaft 34, a member (not shown) for realizing stopper in the hydrodynamic bearing device is fixed to the recess portion 34c, and a hub is fixed to the first projecting portion 34b.

A chamfer 34p is formed by C chamfering, R chamfering, or the like on a tip end face of the first projecting portion 34b. An inner diameter (the minimum outer diameter of the tip end face) C''' of the chamfer 34p is larger, for example, than those in the first to the third embodiments. Thus, when the outer diameter (the outer diameter of the chamfer) of the recess portion 34c is given as A'', then C'''>A''.

More specifically, for example, C''' is 2.5 mm, A'' is 2.2 mm.

The end face 34e, which is an end portion on the side of the recess portion 34c of the first shaft 34, abuts against (the radially outer portion of) an end face 34f of the first projecting portion 34b of the second shaft 34. In particular, the relationship between the sizes of C''' and A'' set such that the first projecting portion 34b does not interfere with the recess portion 34c even when eccentricity is caused between the first shaft 34 and the second shaft 34.

As a result, the first projecting portion 34b does not interfere with the recess portion 34c. Thus, when the plurality of shafts 34 are ground in the centerless grinding machine 30, the shafts 34 do not become engaged with each other, so that outer circumferential faces 34a of the shafts 34 can be precisely ground.

Accordingly, the runout precision (perpendicularity) of an end face 34g (the face to which the hub is attached) with respect to the outer circumferential face of the shaft 34 is improved, and the bearing performance of the radial bearing portion and the thrust bearing portion of the hydrodynamic bearing device 20 is improved.

It should be noted that the present invention can also be implemented by applying the structure for preventing interference in the first to the third embodiments to a shaft having the above-described basic structure (in which a though-hole is formed through the shaft).

Sixth Embodiment

Figure 10:
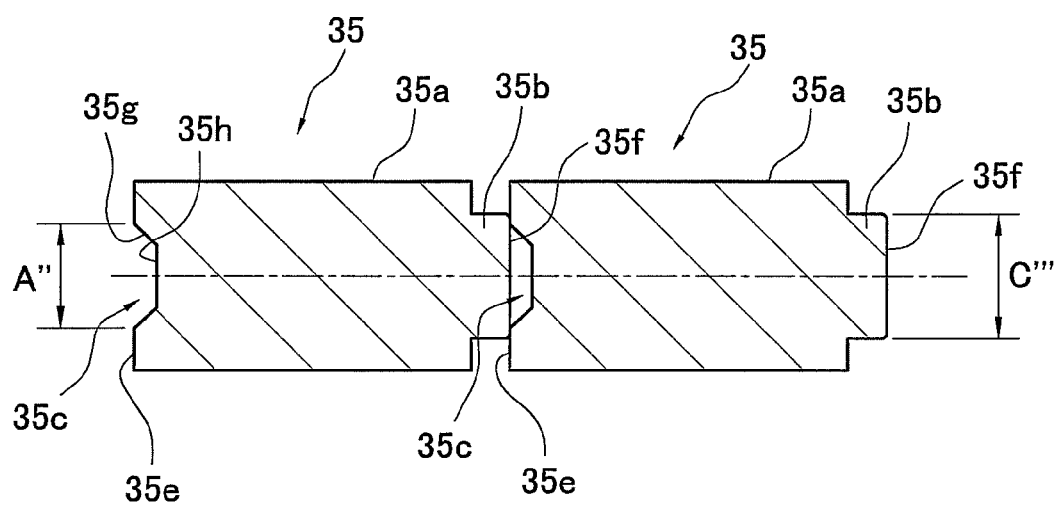
FIG. 10 is a cross-sectional view of shafts according to another embodiment of the present invention.
Figure 11:
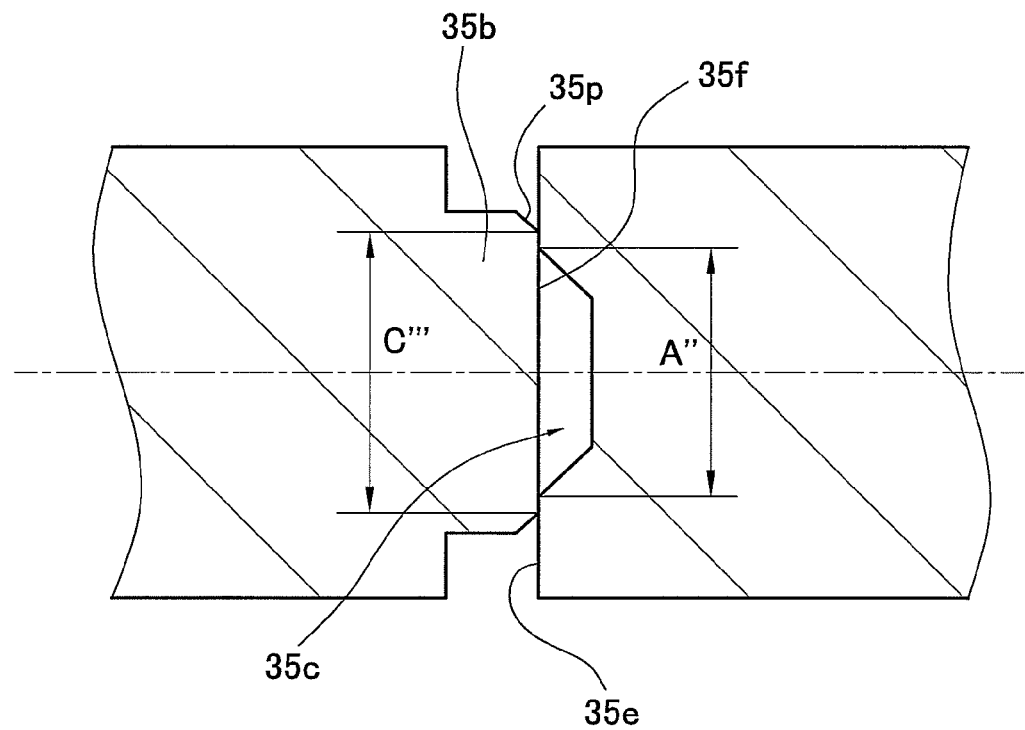
FIG. 11 is a partially enlarged view of FIG. 10, illustrating abutment between shafts.

FIGS. 10 and 11 show the structure of a shaft 35 in a sixth embodiment of the present invention. Unlike the first to the fifth embodiments, in this embodiment, the shaft 35 does not have a tapped hole at all. The shaft 35 has a first projecting portion 35b at one end, and a recess portion 35c at the other end. The recess portion 35c is constituted by a tapered surface 35g whose diameter becomes smaller as the recess portion becomes deeper, and a circular bottom face 35h. The recess portion 35c is formed at the central portion on the end face, and an end face 35e is formed around the recess portion 35c.

In a hydrodynamic bearing device using the shaft 35, the recess portion 35c functions as a dent for capturing foreign objects, and the end face 35e constitutes a part of a hydrodynamic thrust bearing portion.

A chamfer 35p is formed by C chamfering, R chamfering, or the like on a tip end face of the first projecting portion 35b. The inner diameter (the minimum outer diameter of the tip end face) C''' of the chamfer 35p is larger, for example, than those in the first to the third embodiments. Thus, when the outer diameter of the recess portion 35c is given as A'', then C'''>A''.

The end face 35e, which is an end portion on the side of the recess portion 35c of the first shaft 35, abuts against (the radially outer portion of) an end face 35f of the first projecting portion 35b of the second shaft 35. In particular, the relationship between the sizes of C''' and A'' is set such that the first projecting portion 35b does not interfere with the recess portion 35c even when eccentricity is caused between the first shaft 35 and the second shaft 35.

As a result, the first projecting portion 35b does not interfere with the recess portion 35c. Thus, when the plurality of shafts 35 are ground in the centerless grinding machine 30, the shafts 35 do not become engaged with each other, so that outer circumferential faces 35a of the shafts 35 can be precisely ground.

Accordingly, the runout precision (perpendicularity) of an end face 35g (the face to which the hub is attached) with respect to the outer circumferential face of the shaft 35 is improved, and the bearing performance of the radial bearing portion and the thrust bearing portion of the hydrodynamic bearing device 20 is improved.

The present invention can also be implemented by applying the structure for preventing interference in the first to the third embodiments to a shaft having the above-described basic structure (in which a tapped hole is not formed in the shaft).

Other Embodiments

In the description above, embodiments of the present invention are described, but the present invention is not limited to the foregoing embodiments, and various changes can be made within a scope that does not depart from the gist of the invention.

For example, in the foregoing embodiments, the shaft was described as a member that rotates in the hydrodynamic bearing device, but the shaft may be a member on the fixed side.

Figure 12A:
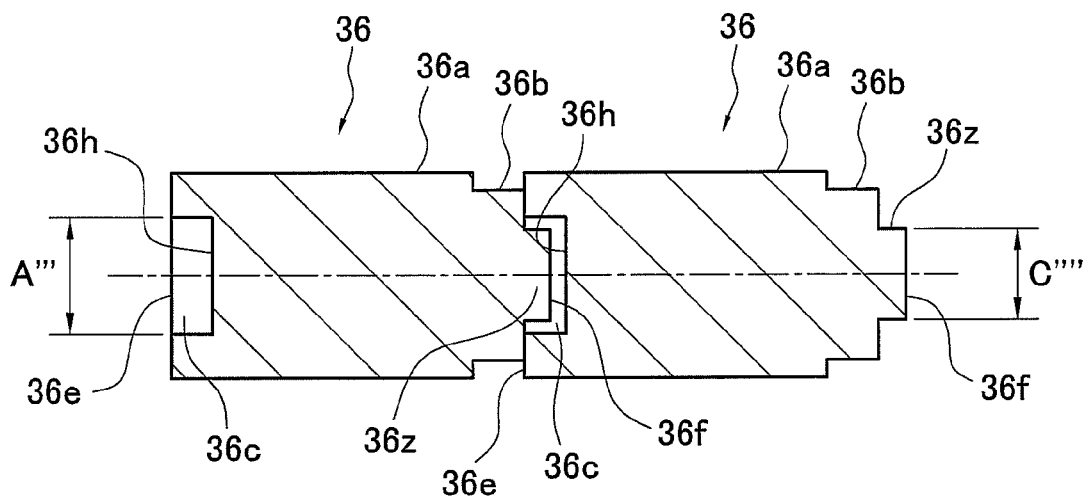
FIGS. 12A and 12B are cross-sectional views of shafts according to another embodiment of the present invention.
Figure 12B:
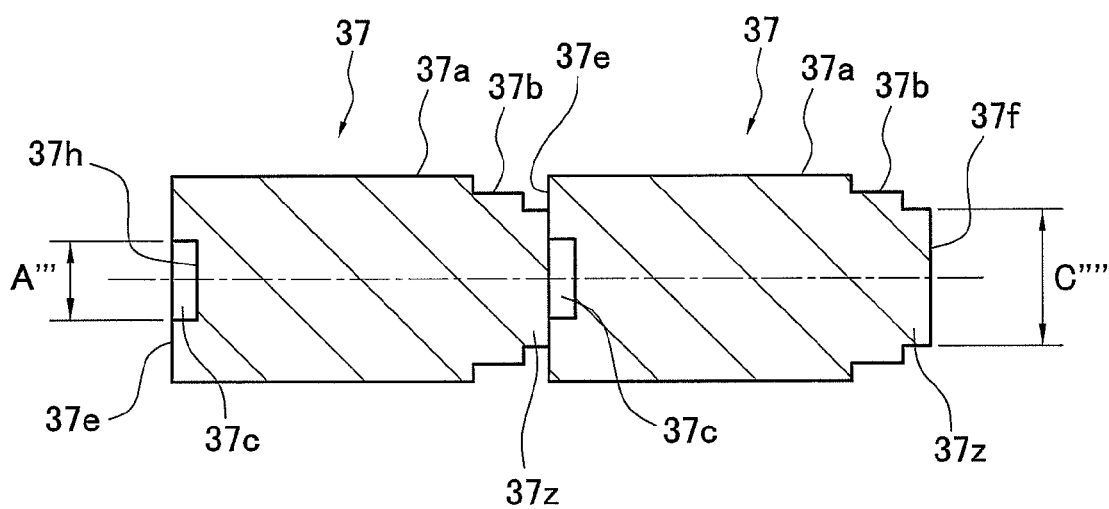

Moreover, in the foregoing embodiments, the configuration was described in which the second projecting portion is provided at the first end, but second projecting portions 36z and 37z may be positioned at a tip end of the first projecting portion as shown in FIGS. 12A and 12B.

Furthermore, in the foregoing embodiments, the shaft was described as a member having one end to which the thrust flange is fixed, but the shaft may be a member to which another member other than the thrust flange is fixed.

The hydrodynamic bearing device of the present invention achieves an effect, for example, that when a plurality of shafts are ground in a centerless grinding machine, the shafts do not become engaged with each other, so that outer circumferential faces of the shafts can be precisely ground. Thus, this hydrodynamic bearing device can be broadly applied to various motors and the like for which a high-quality hydrodynamic bearing device is required.

This application claims priority to Japanese Patent Application No. 2007-186812. The entire disclosure of Japanese Patent Application No. 2007-186812 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention is provided for illustration only, and not for the purpose of limiting the invention as defined by the appended claims and their equivalents.

What is claimed is:

1. A shaft used in a hydrodynamic bearing device, comprising:
    a cylindrical column formed with an outer circumferential face to form a hydrodynamic radial bearing portion;
    a recess portion formed at a first end of the cylindrical column; and
    a first projecting portion formed at a second end of the cylindrical column,
    wherein the recess portion and the first projecting portion are formed such that when a plurality of said shafts are arranged such that the first end of one of the plurality of shafts and the second end of another of the plurality of shafts are arranged side by side in an axis direction, the first projecting portion of the one shaft does not interfere with the recess portion of the other shaft.

2. The shaft according to claim 1, wherein an outer diameter of the first projecting portion is smaller than the minimum inner diameter of the recess portion.

3. The shaft according to claim 1, further comprising a second projecting portion formed at the first end or the second end of the cylindrical column such that when the first end and the second end of the plurality of the shafts are arranged side by side in the axis direction, the second projecting portion prevents the first projecting portion of one of the plurality of shafts from interfering with the recess portion of another of the plurality of shafts by abutting against an end face on the side of the second end or the first end of the other shaft.

4. The shaft according to claim 3, wherein the second projecting portion is formed at the first end of the cylindrical column, and a tip end of the second projecting portion can abut against a portion around the first projecting portion at the second end of the other shaft.

5. The shaft according to claim 4, wherein the second projecting portion is in the shape of a cylinder, and has an inner diameter that is larger than an outer diameter of the first projecting portion.

6. The shaft according to claim 1, wherein the minimum outer diameter of a tip end face of the first projecting portion is larger than the maximum inner diameter of an opening portion of the recess portion.

7. The shaft according to claim 1, wherein a thrust flange is to be attached to the first projecting portion.

8. The shaft according to claim 1, wherein a tapped hole is formed in the recess portion.

9. The shaft according to claim 8, wherein the tapped hole is a hole into which a screw for fixing a clamper is to be threaded.

10. The shaft according to claim 1, wherein a tapped hole is not formed in the recess portion.

11. A hydrodynamic bearing device, comprising:
    the shaft according to claim 1; and
    a sleeve in which a hole for accommodating the shaft is formed.

12. A spindle motor, comprising:
    the hydrodynamic bearing device according to claim 11;
    a rotating member configured to rotate together with one of the shaft and the sleeve of the hydrodynamic bearing device; and
    an electromagnetic driving portion for rotationally driving the rotating member.

13. A recording and reproducing apparatus, comprising:
    the spindle motor according to claim 12; and
    a storage medium that can be mounted on the rotating member.

* * * * *